United States Patent
Deschamps et al.

(10) Patent No.: US 10,761,845 B2
(45) Date of Patent: Sep. 1, 2020

(54) METHOD OF SEQUENCING EXECUTION COMMANDS, EXECUTION METHOD, COMPUTER PROGRAM AND INTEGRATED CIRCUIT

(71) Applicant: Zodiac Aerotechnics, Plaisir (FR)

(72) Inventors: Mikaël Deschamps, Saint Germain de la Grange (FR); Gilles Saint-Aubin, Saint-Georges-sur-Fontaine (FR)

(73) Assignee: Zodiac Aerotechnics, Plaisir (FR)

( * ) Notice: Subject to any disclaimer, the term of this patent is extended or adjusted under 35 U.S.C. 154(b) by 408 days.

(21) Appl. No.: 15/059,815

(22) Filed: Mar. 3, 2016

(65) Prior Publication Data
US 2016/0259642 A1     Sep. 8, 2016

(30) Foreign Application Priority Data

Mar. 3, 2015    (FR) .................................... 15 51790

(51) Int. Cl.
*G06F 9/30* (2018.01)
*G06F 9/48* (2006.01)

(52) U.S. Cl.
CPC ...... *G06F 9/30058* (2013.01); *G06F 9/30021* (2013.01); *G06F 9/4881* (2013.01); *G06F 9/4887* (2013.01)

(58) Field of Classification Search
None
See application file for complete search history.

(56) References Cited

U.S. PATENT DOCUMENTS

| 2003/0037117 A1* | 2/2003 | Tabuchi ................ G06F 9/4843 709/207 |
| 2007/0033384 A1 | 2/2007 | Nankaku et al. |
| 2009/0217272 A1* | 8/2009 | Bortnikov ............. G06F 9/4843 718/101 |
| 2014/0101663 A1* | 4/2014 | Dickson ................ G06F 9/5038 718/103 |
| 2014/0229938 A1* | 8/2014 | Tsirkin .................... G06F 13/24 718/1 |

(Continued)

FOREIGN PATENT DOCUMENTS

WO     2014009213 A1     1/2014

OTHER PUBLICATIONS

French Patent Application No. 1551790, Preliminary Search Report dated Jan. 27, 2016, 12 pages.

*Primary Examiner* — Wynuel S Aquino
*Assistant Examiner* — Melissa A Headly
(74) *Attorney, Agent, or Firm* — Kilpatrick Townsend & Stockton LLP

(57) ABSTRACT

The invention relates to a method of sequencing commands to execute N sets of instructions, where N is a natural number greater than or equal to two, said method being implemented by a control unit suitable for periodically receiving time interrupts and for generating commands to execute the sets of instructions to be executed, said control unit comprising at least a main counter. The method comprises the steps of:
  a) initializing the main counter;
  b) incrementing the main counter upon receipt of a time interrupt;
  c) generating a command to execute a set of instructions to be executed, said set of instructions being selected based on an instantaneous value p of the main counter;
  d) repeating steps a) to d).

12 Claims, 5 Drawing Sheets

(56) References Cited

U.S. PATENT DOCUMENTS

2014/0359184 A1* 12/2014 Kang ................... G06F 9/4812
710/263
2015/0205737 A1 7/2015 Jan et al.

* cited by examiner

METHOD OF SEQUENCING EXECUTION COMMANDS, EXECUTION METHOD, COMPUTER PROGRAM AND INTEGRATED CIRCUIT The present invention concerns the field of methods of sequencing commands o execute tasks. These methods are generally called sequencers.

The present invention also relates to a method of executing sets of instructions, a computer program, and an integrated circuit.

This execution method, this sequencing method, this computer program, and this integrated circuit can be used, for example, in the field of aeronautics.

There are established sequencing methods for managing predefined tasks of a main program, for example an electrical power management program for an aircraft. These methods are developed specifically for the program they will temporally manage. Time slots are allocated for the execution of each task of the main program. The duration of each time slot is determined based on the software load and latency times of each task. This duration is fixed once the sequencing method is programmed. If the manufacturer wants to add additional functionality to this main program, or a specific module for example that adapts the main program to a variety of aircraft or simply meets a specific customer order, the entire sequencing program must be redeveloped and programmed to account for this additional functionality. Such development takes time and is expensive, The object of the invention is to provide an upgradeable sequencing method, meaning a method in which it is always possible to add a command for executing a new feature without having to reprogram the entire sequencing method.

To this end, the invention relates to a method of sequencing commands to execute N sets of instructions, where N is a natural number greater than or equal to two, said method being implemented by a control unit suitable for periodically receiving time interrupts and for generating commands to execute the sets of instructions to be executed, said control unit comprising at least a main counter, characterized in that the method comprises the following steps:
  a) initializing the main counter;
  b) incrementing the main counter upon receipt of a time interrupt;
  c) generating a command to execute a set of instructions to be executed, said set of instructions being selected based on an instantaneous value p of the main counter;
  d) repeating steps a) to d).

Advantageously, this sequencing method is configured based on requirements concerning the software load and latency of the main program. The addition of a command to execute a new set of instructions occurs quickly and easily without impact on the sequencing of the existing sets of instructions.

Advantageously, this sequencing method has a standard structure. It can be adapted to different requirements concerning software load and latency.

Advantageously, this sequencing method is simple to program. In addition, this method makes it simple to add a new task to a main program during development of this main program.

According to some particular embodiments, the sequencing method comprises one or more of the following characteristics:

Said control unit comprises a memory storing a predefined threshold and a secondary counter, and each set of instructions is identified by an integer greater than or equal to zero called a rank, the values of said rank being between Rmin and Rmax inclusive, the generating step comprising the steps of:
  i) initializing the secondary counter;
  ii) calculating a variable V based on the instantaneous value p of the main counter and on an instantaneous value s of the secondary counter;
  iii) determining whether the calculated variable V is an integer;
    if said calculated variable V is an integer:
      comparing the instantaneous value s of the secondary counter to the predefined threshold;
      when the instantaneous value s of the secondary counter is less than the predefined threshold, generating the instantaneous value s of the secondary counter to identify the rank of the set of instructions to be executed;
    if the calculated variable V is not an integer, incrementing the secondary counter s and repeating steps ii) and iii).
  The method returns to step a) when the instantaneous value s of the secondary counter is greater than the predefined threshold.
  The step ii) of calculating the variable V is carried out using the formula indicated below:

$$V = (p - 2^s)/(2 \times 2^s)$$

where p is the instantaneous value of the main counter and s is the instantaneous value of the secondary counter.

The sets of instructions are stored in a working memory, said sets of instructions being intended to be executed periodically by a processing unit at periods that are different from one another, the method comprising an identification step, prior to the initialization step a), in which each set of instructions is identified by a rank, said rank being assigned according to the execution period desired for each set of instructions, the lowest rank being assigned to the set of instructions having the smallest desired execution period.

Said predefined threshold is greater than the total number N of sets of instructions to be executed, said method further comprising a step of identifying an additional set of instructions to be executed by an integer greater than the maximum rank Rmax identifying a set of instructions already stored in said working memory, and a step of saving in the working memory (9) an additional set of instructions to be executed.

Said predefined threshold is equal to the total number N of sets of instructions to be executed.

The method comprises a step of modifying the period defined between the receipt of two consecutive time interrupts.

The method further comprises a step of comparing the instantaneous value p of the main counter to $2^{Rmax+1}$,
  if said instantaneous value p of the main counter is less than $2^{Rmax+1}$, the method returns to step a),
  if said instantaneous value p of the main counter is greater than $2^{Rmax+1}$, the main counter is incremented by one and the method returns to step b).

The invention also relates to a computer program, characterized in that it comprises instructions for implementing the method according to the features mentioned above, when executed by a control unit.

The invention relates in addition to a method of executing at least N sets of instructions stored in a working memory, where N is a natural number greater than or equal to two; each set of instructions being identified by an integer greater than or equal to zero, called a rank; said method being executed by a processing unit connected to said working memory, characterized in that the sets of instructions are executed periodically, the period of a set of instructions of rank i being equal to twice the period of a set of instructions of rank i−1 for any natural number i between 1 and N inclusive.

The invention also relates to an integrated circuit comprising:
an interrupt generator suitable for periodically generating time interrupts,
a control unit suitable for receiving said time interrupts,
a working memory containing N sets of instructions, each set of instructions being identified by an integer greater than or equal to zero, called a rank;
characterized in that said control unit is adapted to execute the above method of sequencing commands to execute sets of instructions.

The integrated circuit further comprises a processing unit connected to said working memory and to the control unit, wherein said processing unit is adapted to execute the above method of commanding the execution of sets of instructions.

The invention will be better understood by reading the following description, given solely by way of example, and with reference to the figures in which:

FIG. 4 is a graph representing the time slots allocated for the execution of four sets of instructions;

FIG. 5 is a graph representing the interruptions of time interrupts generated for the time slots illustrated in FIG. 4;

Figure 1:
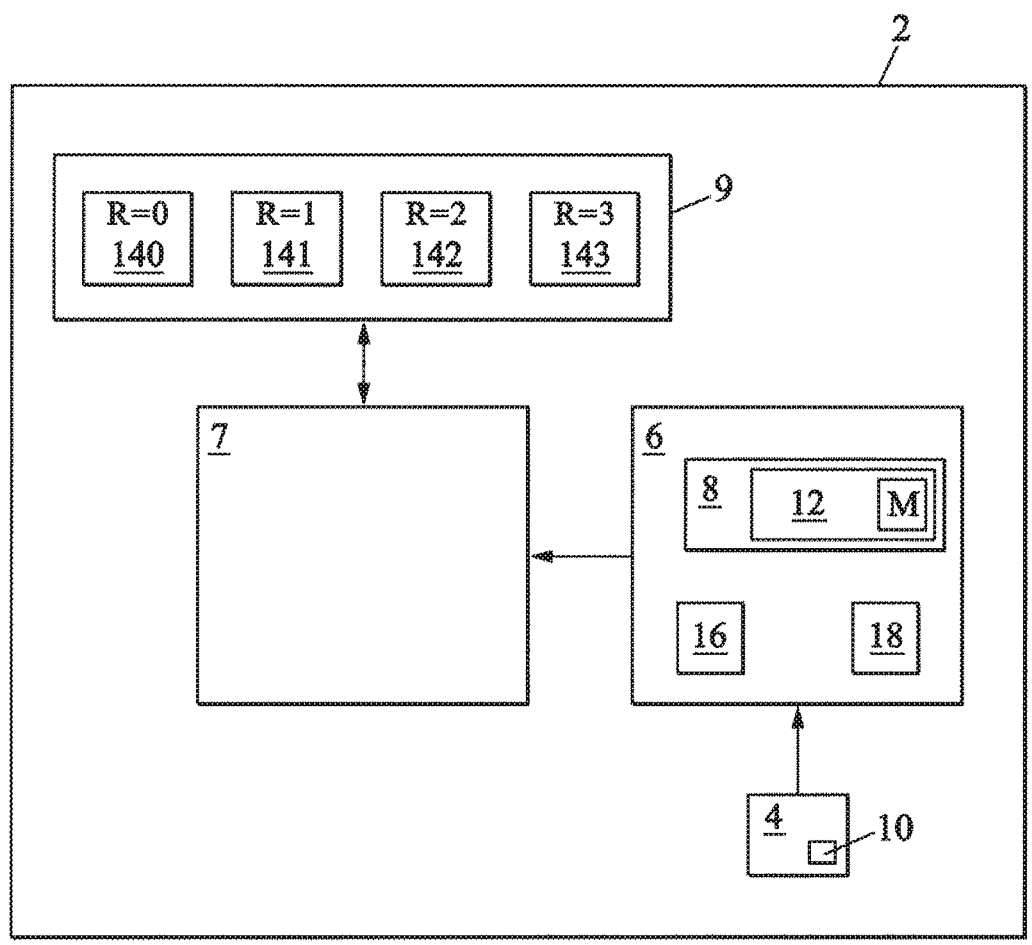
FIG. 1 is a schematic view of an exemplary integrated circuit according to the invention.

The method of executing sets of instructions and the method of sequencing commands according to the invention are implemented by an integrated circuit 2 represented in FIG. 1. The integrated circuit 2 comprises an interrupt generator 4 suitable for periodically generating time interrupts IT, a control unit 6 connected to the time interrupt generator 4, a processing unit 7 connected to the control unit 6, and a working memory 9 connected to the processing unit 7.

The time interrupt generator 4 comprises a clock and an interrupt handler which are not represented. It is adapted to generate a time interrupt IT, for example every 50 μs or every 1 ms.

The time interrupt generator 4 may comprise a control element 10 for varying the duration between time interrupts IT.

The working memory 9 contains N sets of instructions. Each set of instructions is identified by a natural number greater than or equal to zero, called the rank R. The values of said rank are between a minimum rank Rmin and a maximum rank Rmax. In the embodiment represented in FIGS. 1 to 5, the integers constituting the ranks R are successive numbers. They start at 0 and end at N−1. Thus, in this example, the working memory 9 holds four sets of instructions 140, 141, 142, 143 each associated with a rank among the ranks 0, 1, 2, and 3.

The control unit 6 comprises a control memory 8 which contains instructions for implementing the sequencing method according to the invention. These instructions constitute a microprogram generally called a sequencer 12. This sequencer 12 includes a threshold M predefined by an operator during a configuration step. This predefined threshold M can be changed by an operator after development of the sequencer.

The control unit 6 is able to receive time interrupts IT from the time interrupt generator 4 and to run the sequencer 12 in order to generate, in a predefined order and at predefined times, commands to execute the sets of instructions 140, 141, 142, 143.

The control unit 6 comprises a main counter 18 suitable for incrementing an instantaneous value p in order to count the number of time interrupts IT received, and a secondary counter 16 suitable for incrementing an intermediate computed value s hereinafter referred to as the instantaneous value s.

The control unit 6 is adapted to generate a command to execute a set of instructions 140, 141 142, 143 selected from among the sets of instructions stored in the working memory 9, upon receipt of certain time interrupts IT, based on the instantaneous values s and p, as described below.

The processing unit 7 is suitable for receiving the command generated by the control unit 6 and triggering execution of a set of instructions 140, 141, 142, 143.

The control unit 6 and the processing unit 7 consist, for example, of one or more ASIC, computation processor, or DMA controller.

Alternatively, the control unit 6, the processing unit 7, the control memory 8, and the working memory 9 are constituted by a processor.

Alternatively, the ranks are not successive numbers. In such a case, time slots in which no set of instructions are executed are generated for the missing rank(s). Alternatively, the value of the ranks does not start at zero.

Alternatively, the predefined threshold M is equal to the number N of sets of instructions stored in the working memory 9. In this case, execution of the sequencing method is accelerated, but the predefined threshold M must be changed when saving a new set of instructions in the working memory 9.

Figure 2:
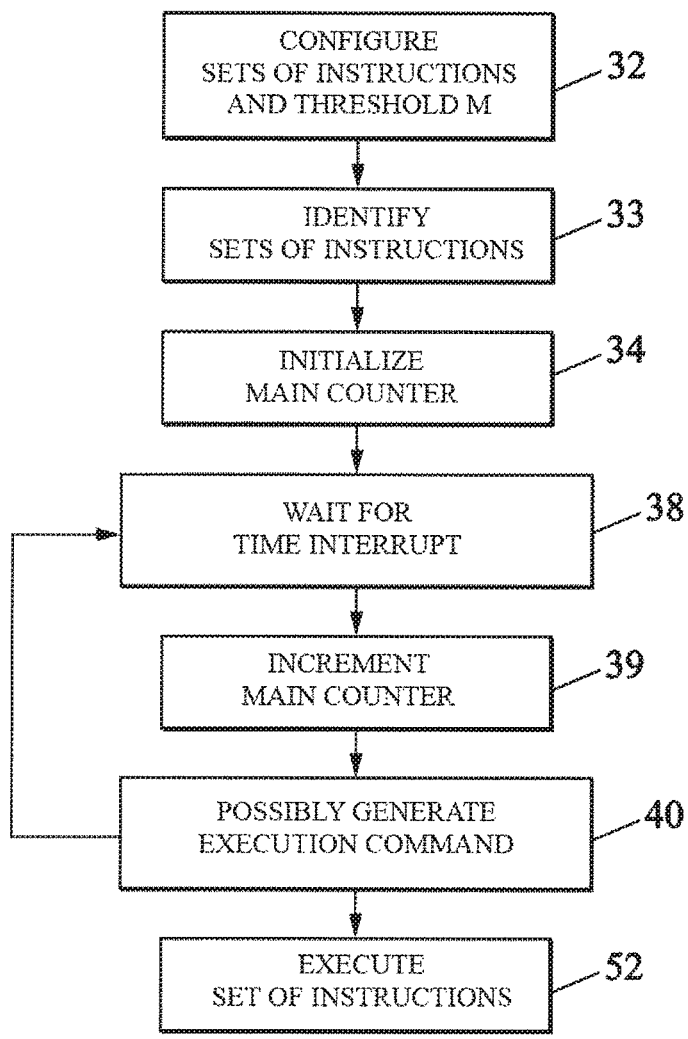
FIG. 2 is a diagram representing some of the steps of the sequencing method of the invention, as well as a step of the execution method of the invention.

Referring to FIG. 2, the sequencing method of the invention begins with a preliminary configuration step 32 in which an operator creates the sets of instructions 140, 141, 142, 143 from the set of instructions for which execution is to be scheduled.

The instructions to be executed are divided into sets according to the software load required, time required to execute the instructions, and latency.

The operator also sets a threshold, called the predefined threshold M. This predefined threshold M is equal to the maximum number of sets of instructions that could be executed by the processing unit 7. This threshold is, for example, equal to the number of sets of instructions stored in the working memory 9, meaning N, plus the number of new functionalities that could be added to the main program and would need to be sequenced.

In a step 33, each set of instructions 140, 141, 142, 143 is identified by a natural number greater than zero, hereinafter called the rank R. This identification is made by considering the period in which the set of instructions is to be executed. The integer having the lowest value is assigned to the set of instructions to be executed in the smallest period. The sets of instructions identified by their rank are stored in the working memory 9.

In a step 34, the main counter 18 is initialized to zero.

When the control unit 6 receives a time interrupt, during a step 38, it is diverted from the task it is currently performing and it increments the main counter 18 by one, during a step 39.

During a step 40, the control unit 6 may possibly generate a command that identifies a set of instructions to be executed. Step 40 is described in detail below in conjunction with FIG. 3.

This command is sent to the processing unit 7 which selects, in the working memory 9, the set of instructions identified by a rank R equal to the integer received from the control unit 6, and executes it during a step 52. As explained below, this integer is the instantaneous value s from the secondary counter. Execution of this set of instructions is ended when the control unit 6 receives a new time interrupt.

When the control unit 6 does not generate a command during step 40, the method of the invention returns to step 38 in which it waits to receive a new time interrupt. In this case, there is no eligible set of instructions for the time interrupt IT. The control unit 6 does not send a command to execute a set of instructions for this time interrupt, No set of instructions is triggered by this time interrupt.

Figure 3:
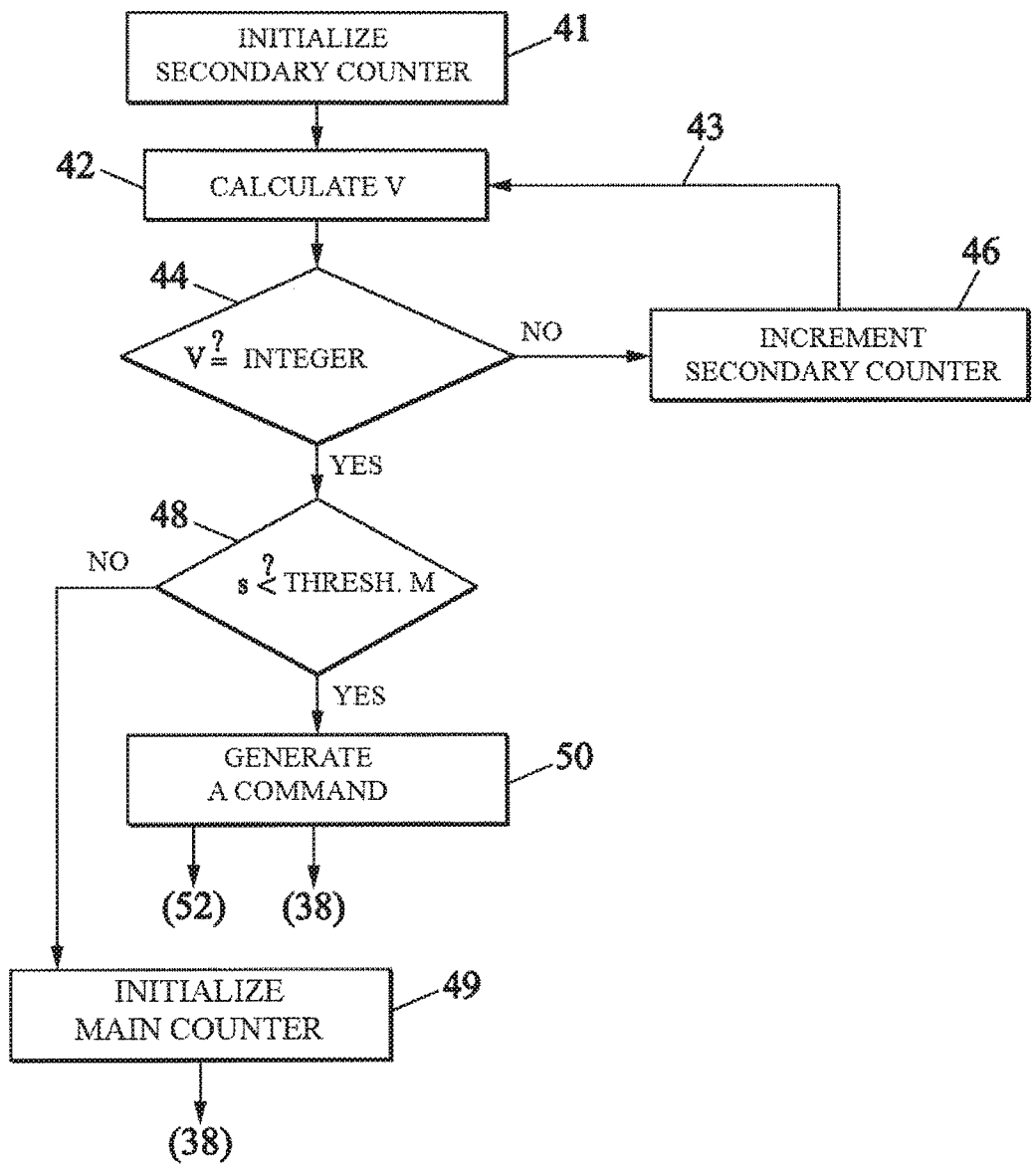
FIG. 3 is a diagram showing details of a step of the sequencing method illustrated in FIG. 2.

The step 40 of generating or not generating an execution command comprises sub-steps 41-50 illustrated in FIG. 3, In a sub-step 41, the secondary counter 16 is initialized to zero.

In a sub-step 42, the control unit 6 calculates a variable V according to the following formula: $V=(p-2^s)/(2\times 2^s)$, where p is the instantaneous value of the main counter 18 and s is the instantaneous value of the secondary counter 16.

In a sub-step 44, the control unit 6 checks whether the calculated variable V is an integer.

If the calculated variable V is not an integer, the method of the invention is followed by a sub-step 46 in which the secondary counter 16 is incremented by one. Then the process returns to sub-step 42, during a sub-step 43.

If the calculated variable V is an integer, the control unit 6 checks, in a sub-step 48, whether the instantaneous value s of the secondary counter is less than the predefined threshold M.

If the instantaneous value s of the secondary counter is less than the predefined threshold M, the control unit 6 generates, in a sub-step 50, a command to execute a set of instructions. This command contains the instantaneous value s of the secondary counter 16. This instantaneous value s identifies the rank R of the set of instructions to be executed by the processing unit 7. This instantaneous value s is sent to the processing unit 7. Thus, the sequencing method of the invention assigns to the time interrupt IT, received during step 38, the set of instructions identified by the instantaneous value s generated by the control unit 6.

Lastly, the control unit 6 returns to step 38 in which the control unit 6 waits for the next time interrupt IT.

If, during sub-step 48, the instantaneous value s of the secondary counter is greater than the predefined threshold M, the main counter 18 is initialized during sub-step 49.

Then, the method of the invention returns to step 38. The control unit 6 waits for a new time interrupt IT.

If the operator wants to add new functionality to the main computer program, the program portion (subroutine) that provides this new functionality will constitute an additional set of instructions.

Figure 6:
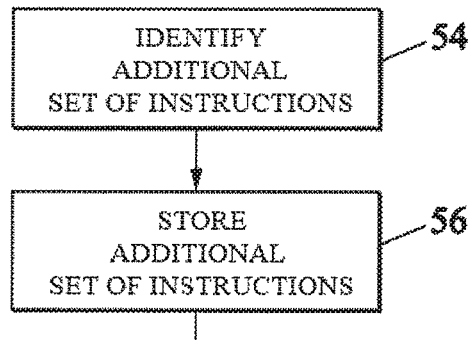
FIG. 6 is a diagram representing the steps of the sequencing method of the invention which add the sequencing of an additional set of instructions.

During a step 54, illustrated in FIG. 6, an operator identifies the additional set of instructions by a new rank. This new rank is equal to the maximum rank Rmax already assigned to a set of instructions, plus one. This new rank must be at or below the predefined threshold M. If such is not the case, the operator can change the predefined threshold M.

During a step 56, the operator stores the additional set of instructions in the working memory 9.

After the addition of an additional functionality, the sequencing method of the invention is implemented in the conventional manner. It begins with the step 34 of initializing the main counter 18.

The operator can, if so desired, modify the duration D of the time slots during which the sets of instructions are executed. To do so, the operator modifies, during a step 58, the duration D between the receipt of two time interrupts IT by controlling the control element 10 of the interrupt generator. This modification causes a change in the duration D of the time slots.

After modification of this duration D, the sequencing method according to the invention is implemented in the conventional manner. It begins with the step 34 of initializing the main counter 18.

Figure 4:
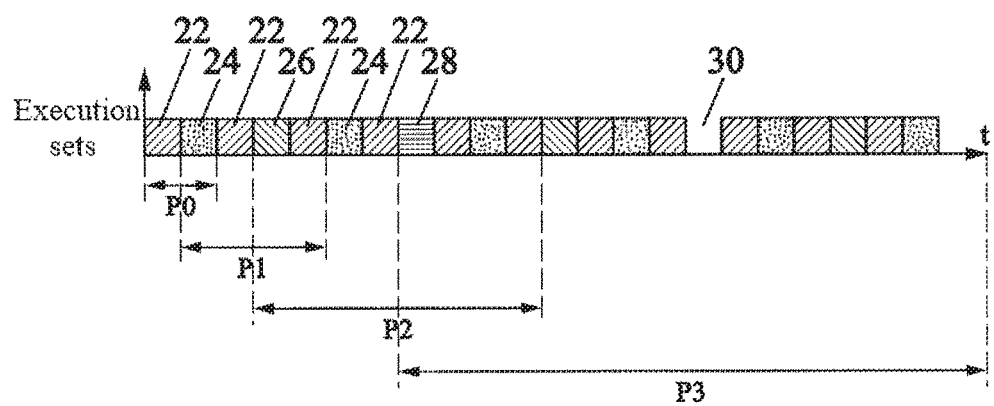
FIGS. 4 and 5 show an example implementation of the sequencing method of the invention, in which four sets of instructions are executed, in particular.
Figure 5:

FIG. 4 represents an example of time slots allocated for the execution of the four sets of instructions shown in FIG. 1 by using the sequencing method of the invention. The time slots assigned to the sets of instructions all have the same duration D. This duration D corresponds to the time between the generation of two successive time interrupts IT, as shown in FIG. 5.

The first set of instructions 140 is executed in all time slots 22. The second set of instructions 141 is executed in all time slots 24. The third set of instructions 142 is executed in all time slots 26. The fourth set of instructions 143 is executed in all time slots 28. The period of a set of instructions is defined in the present patent application as the duration between the beginning of the execution of a set of instructions and the beginning of the next execution of the same set of instructions. The period of the set of instructions having the lowest rank Rmin is referred to below using the reference P0.

As can be seen in FIG. 4, the period of execution of a set of instructions is a multiple of a power of two (2) or of half (½) of the period of execution of a another set of instructions. For example, the period P1 of the set of instructions 141 of rank 1 is equal to twice the period P0 of the set of instructions 140 of rank 0. In general, the period of a set of instructions of rank i is equal to twice the period of a set of instructions of rank i−1, for any natural number i between 1 and N.

Lastly, as can be seen in FIG. 4, the sequencing method of the invention comprises time slots 30 during which no set of instructions is executed. These time slots 30 provide available time for the possible execution of an additional set of instructions. This additional set of instructions would correspond to a new functionality that could be added to the main program. If no new functionality is added to the main program, these time slots 30 remain "empty", meaning that the processing unit 7 will not execute any set of instructions during them.

These unassigned time slots 30 have a period equal to twice the period of the highest ranked set of instructions stored in the main memory 9. Thus, the period of the unassigned time slots is equal to $2^N$ the period of the set of instructions of rank 0, where N is the number of sets of instructions.

Regardless of the number of sets of instructions to be executed, the sequencing method of the invention always generates time slots during which no set of instructions is executed, referred to as unassigned time slots. When a first new functionality is added to the main program, the method of the invention allows sequencing an additional set of instructions corresponding to this first new functionality without impacting the existing sequencing, as described in connection with FIG. 6, The addition of this additional set of instructions creates the appearance of new unassigned time slots that eventually can be used to add a second new functionality. These new unassigned time slots always have a period equal to twice the period of the highest ranked set of instructions. This rank then corresponds to the rank of the set of instructions of the first new functionality.

Figure 8:
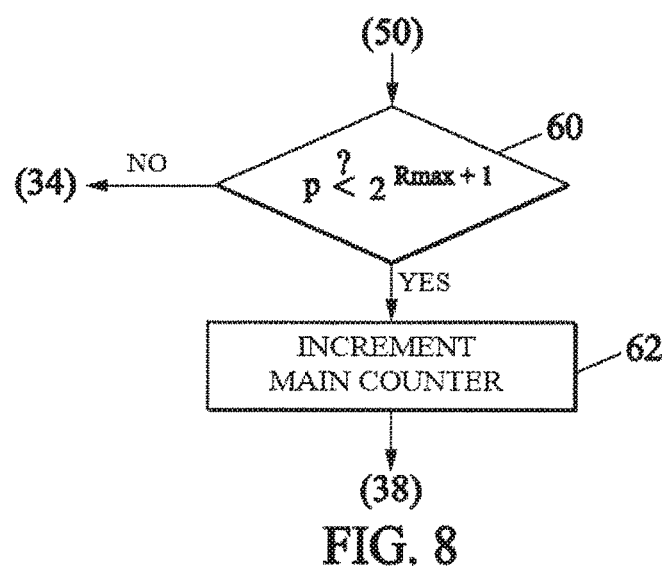
FIG. 8 is a diagram illustrating steps of an alternative embodiment of the sequencing method of the invention.

According to a variant embodiment of the invention, the sequencing method comprises the steps illustrated in FIGS. 2 and 3 and the steps illustrated in FIG. 8, Steps 32-52 are conducted in the same manner as in the sequencing method, with the exception that in this embodiment the main counter 18 is initialized to one (=1) in steps 34 and 49, and the secondary counter 16 is initialized to the value of the minimum rank Rmin. In this embodiment, the maximum rank Rmax can be greater than the predefined threshold M and than the number N of sets of instructions.

Moreover, according to this alternative embodiment, the method further comprises the steps illustrated in FIG. 8. Thus, after sub-step 50 of generating a command to execute a set of instructions, the control unit 6 checks, in a step 60, whether the instantaneous value p of the main counter 18 is less than $2^{Rmax+1}$ where Rmax is the highest rank of the sets of instructions stored in the working memory 9.

If the instantaneous value p is less than $2 \times 2^{(N-1)}$, the control unit 6 increments the main counter 18 during a step 62, Then the control unit 6 returns to step 38 in which it waits to receive a time interrupt IT.

If the instantaneous value p is greater than $2 \times 2^{(N-1)}$, the control unit 6 returns to step 34 during which the main counter is initialized to one, For example, the number of sets of instructions N is equal to two. The first set of instructions has a rank equal to 1. The second set of instructions has a rank equal to 3. The predefined threshold M is equal to 5. The first set of instructions will be executed once every 4 time interrupts. The second set of instructions will be executed every 16 time interrupts.

Advantageously, in this embodiment, the longest period of execution is no longer limited by the predefined threshold M.

This variant embodiment is used with a predefined threshold M greater than the number N of sets of instructions. It allows not having to scan all possible ranks but only the ranks identifying sets of instructions. The sequencing method using this variant is faster and allows the addition of additional functionalities without having to modify the predefined threshold M after its development.

Figure 7:
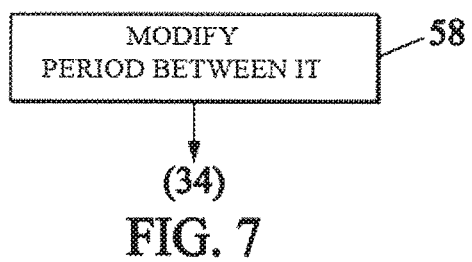
FIG. 7 is a diagram representing a step of the sequencing method of the invention in which the duration of the time slots is changed.

The steps illustrated in FIGS. 6 and 7 may also be implemented with this variant embodiment.

The invention claimed is:

1. A method for causing a plurality of sets of instructions to be executed by a processing unit in a particular sequence, the method being implemented by a control unit suitable for periodically receiving time interrupts and for transmitting commands to the processing unit to execute the plurality of sets of instructions, the method comprising:
   a) initializing a main counter in a memory of the control unit to have a main instantaneous value of zero;
   b) incrementing the main instantaneous value of the main counter upon receipt of a time interrupt;
   c) in response to receiving the time interrupt, generating a command to execute a set of instructions among the plurality of sets of instructions at least in part by:
      i) initializing a secondary counter in the memory to have a secondary instantaneous value of zero;
      ii) calculating a value based on the main instantaneous value of the main counter and on the secondary instantaneous value of the secondary counter;
      iii) determining whether the calculated value is an integer; and
      iv) if the calculated value is an integer:
         comparing the secondary instantaneous value of the secondary counter to a predefined threshold stored in the memory; and
         based on determining that the secondary instantaneous value of the secondary counter is less than the predefined threshold, transmitting a command configured to cause the processing unit to execute a particular set of instructions among the plurality of sets of instructions, the command including the secondary instantaneous value of the secondary counter for identifying a rank of the particular set of instructions; or
      v) if the calculated value is not an integer, incrementing the secondary instantaneous value of the secondary counter and repeating steps ii) and iii); and
   d) repeating steps a) to c) at least once.

2. The method of claim 1, wherein the method returns to step a) when the secondary instantaneous value of the secondary counter is greater than the predefined threshold.

3. The method of 1, wherein the value is calculated using the following formula:

$$V=(p-2_s)/(2 \times 2^s)$$

where p is the main instantaneous value of the main counter, s is the secondary instantaneous value of the secondary counter, and V is the value calculated.

4. The method of claim 1, the method further comprising, prior to step a), an identification step in which each set of instructions in the plurality of sets of instructions is identified by a respective rank that is assigned to the set of instructions according to an execution period desired for the set of instructions, wherein a lowest rank is assigned to a set of instructions having a smallest desired execution period among the plurality of sets of instructions and a maximum rank is assigned to another set of instructions having a largest desired execution period among the plurality of sets of instructions.

5. The method of claim 4, wherein the predefined threshold is greater than a total number of sets of instructions within the plurality of sets of instructions, said method further comprising:
   receiving an additional set of instructions to be executed by the processing unit;
   assigning a rank value to the additional set of instructions, the rank value being an integer that is larger than the maximum rank; and
   saving the additional set of instructions in a working memory that is accessible to the processing unit.

6. The method of claim 1, wherein said predefined threshold is equal to a total number of sets of instructions among the plurality of sets of instructions.

7. The method of claim 1, further comprising modifying a period defined between the receipt of two consecutive time interrupts.

8. The method of claim 4, further comprising:
comparing the main instantaneous value of the main counter to $2^{Rmax+1}$, where Rmax is the maximum rank, and
if said main instantaneous value of the main counter is less than $2^{Rmax+1}$ returning to step a), or
if said main instantaneous value of the main counter is greater than $2^{Rmax+1}$ incrementing the main counter by one and returning to step b).

9. A non-transitory computer-readable medium comprising program code that is executable by a control unit for causing the control unit to implement operations comprising:
  a) initializing a main counter in a memory of the control unit to have a main instantaneous value of zero;
  b) incrementing the main instantaneous value of the main counter upon receipt of a time interrupt;
  c) in response to receiving the time interrupt, generating a command to execute a set of instructions among the plurality of sets of instructions at least in part by:
    i) initializing a secondary counter in the memory to have a secondary instantaneous value of zero;
    ii) calculating a value based on the main instantaneous value of the main counter and on the secondary instantaneous value of the secondary counter;
    iii) determining whether the calculated value is an integer; and
    iv) if the calculated value is an integer:
      comparing the secondary instantaneous value of the secondary counter to a predefined threshold stored in the memory; and
      based on determining that the secondary instantaneous value of the secondary counter is less than the predefined threshold, transmitting a command configured to cause a processing unit to execute a particular set of instructions among the plurality of sets of instructions, the command including the secondary instantaneous value of the secondary counter for identifying a rank of the particular set of instructions; or
    v) if the calculated value is not an integer, incrementing the secondary instantaneous value of the secondary counter and repeating steps ii) and iii); and
  d) repeating steps a) to c) at least once.

10. A method for executing instruction sets on a processing unit, the method comprising:
determining, by the processing unit, a respective rank for each set of instructions among a plurality of sets of instructions stored in a working memory; and
executing, by the processing unit, the plurality of sets of instructions in a particular sequence in which each set of instructions among the plurality of sets of instructions is executed at a respective period based on the respective rank for the set of instructions, the respective period being a duration between beginnings of successive executions of the set of instructions wherein the duration is equal to twice another period for another set of instructions among the plurality of sets of instructions having a rank equal to the respective rank minus one.

11. An integrated circuit comprising:
a time interrupt generator suitable for periodically generating time interrupts,
a control unit suitable for receiving said time interrupts, and
a working memory comprising a plurality of sets of instructions, each set of instructions among the plurality of sets of instructions having a respective rank that is an integer value greater than or equal to zero;
wherein the control unit is adapted to execute the method of claim 1.

12. The integrated circuit of claim 11, further comprising a processing unit connected to the working memory and to the control unit.

* * * * *